(12) United States Patent
Wang et al.

(10) Patent No.: US 11,169,911 B2
(45) Date of Patent: Nov. 9, 2021

(54) METHOD AND APPARATUS FOR PERFORMING A FITTING CALCULATION ON TEST DATA AND GENERATING DATA FLUCTUATION VALUES

(71) Applicant: BEIJING BAIDU NETCOM SCIENCE AND TECHNOLOGY CO., LTD., Beijing (CN)

(72) Inventors: Bo Wang, Beijing (CN); Yu Chen, Beijing (CN); Tianqi Wang, Beijing (CN)

( * ) Notice: Subject to any disclaimer, the term of this patent is extended or adjusted under 35 U.S.C. 154(b) by 282 days.

(21) Appl. No.: 16/352,506

(22) Filed: Mar. 13, 2019

(65) Prior Publication Data

US 2019/0370163 A1     Dec. 5, 2019

(30) Foreign Application Priority Data

May 29, 2018   (CN) .......................... 201810529012.1

(51) Int. Cl.
*G06F 11/36* (2006.01)
*G06F 11/07* (2006.01)

(52) U.S. Cl.
CPC ...... *G06F 11/3692* (2013.01); *G06F 11/0706* (2013.01); *G06F 11/3688* (2013.01)

(58) Field of Classification Search
CPC ............. G06F 11/3692; G06F 11/3688; G06F 11/0706
See application file for complete search history.

(56) References Cited

U.S. PATENT DOCUMENTS

| 10,025,700 | B1* | 7/2018 | Shahrzad | G06F 11/3668 |
| 10,031,796 | B1* | 7/2018 | Havemose | G06F 11/079 |
| 10,656,989 | B1* | 5/2020 | Havemose | G06F 11/0706 |

FOREIGN PATENT DOCUMENTS

| CN | 107508815 A | * | 12/2017 |
| CN | 107508815 A |   | 12/2017 |
| CN | 108076019 A | * | 5/2018 |
| CN | 108076019 A |   | 5/2018 |

* cited by examiner

*Primary Examiner* — Matthew M Kim
*Assistant Examiner* — Indranil Chowdhury
(74) *Attorney, Agent, or Firm* — Knobbe, Martens, Olson & Bear, LLP (57) ABSTRACT

A method and an apparatus for outputting information are provided. The method includes: acquiring at least one piece of test data generated in a target period; performing a fitting calculation on the at least one piece of test data to obtain estimated test data in the target period; and determining, for a test time point in the target period, a difference value between test data generated at the test time point and corresponding estimated test data as a target difference value; determining at least one historical correspondence difference value corresponding to the determined target difference value; and generating and outputting a data fluctuation value based on the determined target difference value and the determined at least one historical correspondence difference value.

14 Claims, 5 Drawing Sheets

METHOD AND APPARATUS FOR PERFORMING A FITTING CALCULATION ON TEST DATA AND GENERATING DATA FLUCTUATION VALUES

CROSS-REFERENCE TO RELATED APPLICATIONS

This application claims priority to Chinese Patent Application No.201810529012.1, filed on May 29, 2018, titled "Method and Apparatus for Outputting Information," which is hereby incorporated by reference in its entirety.

TECHNICAL FIELD

Embodiments of the present disclosure relate to the field of computer technology, specifically to a method and apparatus for outputting information.

BACKGROUND

In some scenarios where specific objects (such as website traffic) are tested, it is very important to analyze whether the test data is abnormal. Generally, the test data have cyclically stable fluctuations. Therefore, when the test data change abruptly, some faults are likely to occur, and timely detection of these abnormalities may reduce losses caused by the faults. At present, there are many methods for monitoring the abnormal fluctuation of the test data. For example, the abnormality fluctuation of the data may be monitored by setting a test data threshold, or the differences between the current data and historical synchronous data are compared using loop comparison, thereby determining whether the current data is abnormal.

SUMMARY

Embodiments of the present disclosure provide a method and apparatus for outputting information.

In a first aspect, the embodiments of the present disclosure provide a method for outputting information, including: acquiring at least one piece of test data generated in a target period; performing a fitting calculation on the at least one piece of test data to obtain estimated test data in the target period; and determining, for a test time point in the target period, a difference value between test data generated at the test time point and the estimated test data corresponding to the test time point calculated by fitting as a target difference value; determining at least one historical correspondence difference value corresponding to the determined target difference value, the historical correspondence difference value being a difference value between test data and estimated test data of a corresponding historical test time point of the test time point; and generating and outputting a data fluctuation value representing a fluctuation of the test data generated at the test time point based on the determined target difference value and the determined at least one historical correspondence difference value.

In some embodiments, the performing a fitting calculation on the at least one test data to obtain estimated test data in the target period includes: acquiring parameters for performing a fitting calculation on historical test data in a historical test data set; and performing the fitting calculation on the at least one piece of test data based on the acquired parameters to obtain the estimated test data in the target period.

In some embodiments, the generating and outputting a data fluctuation value representing a fluctuation of the test data generated at the test time point based on the determined target difference value and the determined at least one historical correspondence difference value includes: determining a distribution of the determined target difference value and the determined at least one historical correspondence difference as a normal distribution; determining, standard scores of the determined target difference value and a historical correspondence difference value in the determined at least one historical correspondence difference value under the normal distribution as distribution deviation values; and generating and outputting the data fluctuation value representing the fluctuation of the test data generated at the test time point, based on the distribution deviation value of the determined target difference value and the distribution deviation value of the historical correspondence difference value in the determined at least one historical correspondence difference value.

In some embodiments, the generating and outputting the data fluctuation value representing the fluctuation of the test data generated at the test time point, based on the distribution deviation value of the determined target difference value and the distribution deviation value of the historical correspondence difference value in the determined at least one historical correspondence difference value includes: determining a distribution of the determined distribution deviation values as the normal distribution; and determining a standard score of the distribution deviation value corresponding to the determined target difference value under the normal distribution as the data fluctuation value representing the fluctuation of the test data tested at the test time point and outputting the standard score.

In some embodiments, the generating and outputting the data fluctuation value representing the fluctuation of the test data generated at the test time point, based on the distribution deviation value of the determined target difference value and the distribution deviation value of the historical correspondence difference value in the determined at least one historical correspondence difference value includes: converting the determined distribution deviation values into conversion values in a preset numerical interval; determining a distribution of the conversion values obtained by converting as an exponential distribution; and determining a probability value of the conversion value corresponding to the target difference value under the exponential distribution as the data fluctuation value representing the fluctuation of the test data generated at the test time point and outputting the probability value.

In some embodiments, after the generating and outputting a data fluctuation value representing a fluctuation of the test data generated at the test time point, the method further includes: outputting preset warning information, in response to determining that an absolute value of the generated data fluctuation value is greater than a preset fluctuation threshold.

In a second aspect, the embodiments of the present disclosure provide an apparatus for outputting information, including: an acquisition unit, configured to acquire at least one piece of test data generated in a target period; a calculation unit, configured to perform a fitting calculation on the at least one piece of test data to obtain estimated test data in the target period; and a generation unit, configured to determine, for a test time point in the target period, a difference value between test data generated at the test time point and estimated test data corresponding to the test time point calculated by fitting as a target difference value; determine at least one historical correspondence difference value corresponding to the determined target difference value, the historical correspondence difference value being a difference value between test data and estimated test data of a corresponding historical test time point of the test time point; and generate and output a data fluctuation value representing a fluctuation of the test data generated at the test time point based on the determined target difference value and the determined at least one historical correspondence difference value.

In some embodiments, the calculation unit includes: an acquisition module, configured to acquire parameters for performing a fitting calculation on historical test data in a historical test data set; and a calculation module, configured to perform the fitting calculation on the at least one piece of test data based on the acquired parameters to obtain the estimated test data in the target period.

In some embodiments, the generation unit includes: a first determination module, configured to determine a distribution of the determined target difference value and the determined at least one historical correspondence difference as a normal distribution; a second determination module, configured to determine, standard scores of the determined target difference value and a historical correspondence difference value in the determined at least one historical correspondence difference value under the normal distribution as distribution deviation values; and a generation module, configured to generate and output the data fluctuation value representing the fluctuation of the test data generated at the test time point, based on the distribution deviation value of the determined target difference value and the distribution deviation value of the historical correspondence difference value in the determined at least one historical correspondence difference value.

In some embodiments, the generation module includes: a first determination submodule, configured to determine a distribution of the determined distribution deviation values as a normal distribution; and a first outputting submodule, configured to determine a standard score of the distribution deviation value corresponding to the determined target difference value under the normal distribution as the data fluctuation value representing the fluctuation of the test data tested at the test time point and output the standard score.

In some embodiments, the generation module includes: a conversion submodule, configured to convert the determined distribution deviation values into conversion values in a preset numerical interval; a second determination submodule, configured to determine a distribution of the conversion values obtained by converting as an exponential distribution; and a second outputting submodule, configured to determine a probability value of the conversion value corresponding to the target difference value under the exponential distribution as the data fluctuation value representing the fluctuation of the test data generated at the test time point and output the probability value.

In some embodiments, the apparatus further includes: an outputting unit, configured to output preset warning information, in response to determining that an absolute value of the generated data fluctuation value is greater than a preset fluctuation threshold.

In a third aspect, the embodiments of the present disclosure provide a server, including: one or more processors; and a storage apparatus, storing one or more programs thereon, and the one or more programs, when executed by the one or more processors, cause the one or more processors to implement the method as described in any one of the embodiments in the first aspect.

In a fourth aspect, the embodiments of the present disclosure provide a computer readable medium, storing a computer program thereon, the computer program, when executed by a processor, implements the method as described in any one of the embodiments in the first aspect.

The method and apparatus for outputting information provided by the embodiments of the present disclosure acquire at least one piece of test data generated in a target period, then perform a fitting calculation on the at least one piece of test data to obtain estimated test data in the target period, and then determine, for a test time point in the target period, a corresponding target difference value and a historical correspondence difference value, and generate and output a data fluctuation value representing a fluctuation of the test data generated at the test time point based on the determined target difference value and the determined historical correspondence difference value, thereby improving the accuracy of characterizing the fluctuation of the test data and improving the flexibility of processing the test data.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the convenience of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
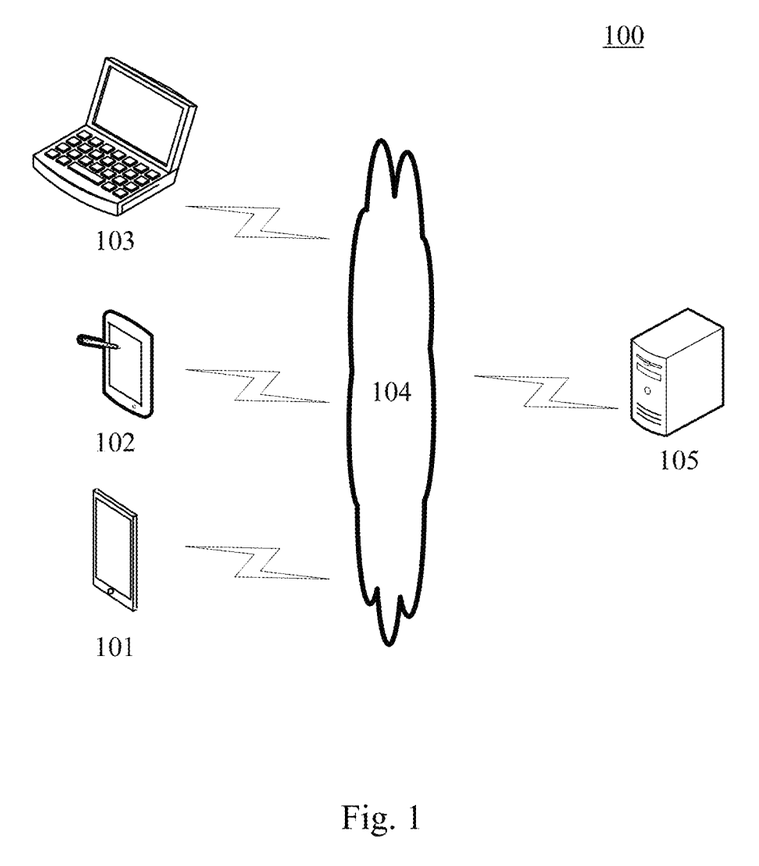
FIG. 1 is a system architecture diagram to which an embodiment of the present disclosure may be applied.

FIG. 1 illustrates a system architecture 100 to which a method for outputting information or an apparatus for outputting information of the embodiments of the present disclosure may be applied.

As shown in FIG. 1, the system architecture 100 may include terminal devices 101, 102 and 103, a network 104 and a server 105. The network 104 may be configured to provide a communication link medium between the terminal devices 101, 102 and 103 and the server 105. The network 104 may include various types of connections, such as wired, wireless communication links, or optical fibers.

A user may interact with the server 105 via the network 104 using the terminal devices 101, 102 and 103 to receive or transmit messages and the like. Various communication client applications, such as a network browser application, a shopping application, and a search application, may be installed on the terminal devices 101, 102, and 103.

The terminal devices 101, 102 and 103 may be hardware or software. If being hardware, the terminal devices 101, 102 and 103 may be various electronic devices having access to network functions, including but not limited to smart phones, tablets, e-book readers, MP3 players (Moving Picture Experts Group Audio Layer III), MP4 (Moving Picture Experts Group Audio Layer IV) players, laptop portable computers and desktop computers. If being software, the terminal devices 101, 102 and 103 may be installed in the above-listed electronic devices. The terminal devices 101, 102 and 103 may be implemented as a plurality of software applications or software modules (e.g., software applications or software modules used to provide distributed services) or as a single software application or software module, which is not specifically limited in the present disclosure.

The server 105 may be a server that provides various services, such as a background network management server that provides support for networks accessed by the terminal devices 101, 102, 103. The background network management server may acquire test data (for example, data such as the access traffic generated by the user accessing the network through the terminal device), process the acquired test data, and output the processing result (for example, a data fluctuation value representing the fluctuation of the test data).

It should be noted that the method for outputting information provided by the embodiments of the present disclosure is generally executed by the server 105, and accordingly, the apparatus for outputting information is generally provided in the server 105.

It should be noted that the server may be hardware or software. If the server is hardware, the server may be implemented as a distributed server cluster composed of multiple servers, or as a single server. When the server is software, the server may be implemented as multiple software applications or software modules (for example, software or software modules for providing distributed services), or as a single software application or software module, which is not specifically limited in the present disclosure.

It should be understood that the number of terminal devices, networks, or servers in FIG. 1 is merely illustrative. Depending on the implementation needs, there may be any number of terminal devices, networks, or servers.

Figure 2:
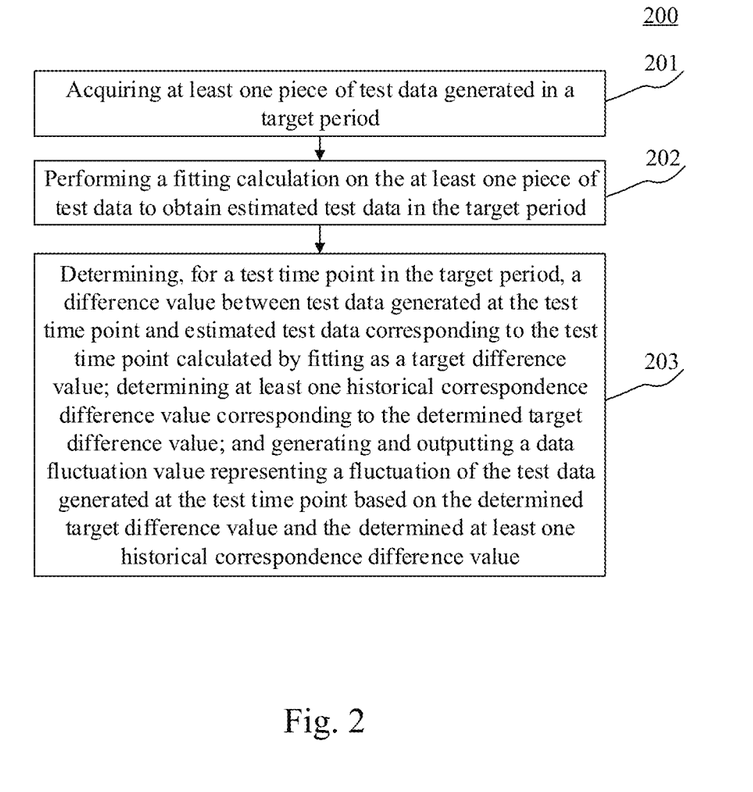
FIG. 2 is a flowchart of an embodiment of a method for outputting information according to the present disclosure.

With further reference to FIG. 2, a flow 200 of an embodiment of a method for outputting information according to the present disclosure is illustrated. The method for outputting information includes the following steps 201 to 203.

Step 201 includes acquiring at least one piece of test data generated in a target period.

In the present embodiment, the executing body of the method for outputting information (for example, the server as shown in FIG. 1) may acquire at least one piece of test data generated in a target period remotely or locally through a wired connection or a wireless connection. The test data may be test data (for example, the access traffic of a certain website, the download amount of a certain software, etc.) obtained by testing a target object (for example, a certain website, a certain software, etc.) at a certain time point. The target period may be one of a plurality of periods preset by a technician, and in each period, the executing body or other electronic devices may inspect the target object according to a preset inspection period (for example, one minute) to obtain at least one piece of test data. The executing body may select one period from the plurality of periods as the target period (for example, the period closest to the current time). As an example, assuming that each of the plurality of periods has a length of 30 minutes, and each period is first or last 30 minutes of one of 24 hours of a day, and one piece of test data is generated every minute, so that the target period may be the period closest to the current time. For example, if the current time is 12:05, the target period may be 11:30 to 12:00.

Step 202 includes performing a fitting calculation on the at least one piece of test data to obtain estimated test data in the target period.

In the present embodiment, based on the at least one piece of test data acquired in step 201, the executing body may perform the fitting calculation on the at least one piece of test data to obtain the estimated test data in the target period. Here, for each of the at least one piece of test data, the piece of test data corresponds to one estimated piece of test data. Specifically, the executing body may perform the fitting calculation on the at least one piece of test data based on an existing fitting calculation method (such as the least squares method and the iterative weighted least squares method).

Step 203 includes determining, for a test time point in the target period, a difference value between test data generated at the test time point and estimated test data corresponding to the test time point calculated by fitting, as a target difference value; determining at least one historical correspondence difference value corresponding to the determined target difference value; and generating and outputting a data fluctuation value representing a fluctuation of the test data generated at the test time point based on the determined target difference value and the determined at least one historical correspondence difference value.

In the present embodiment, for the test time point in the target period, the executing body may first determine the difference value between test data generated at the test time point and estimated test data corresponding to the test time point calculated by fitting, as the target difference value. Generally, the target period may include a preset number of test time points. At each test time point, the executing body or other electronic devices may test the target object to generate the test data.

Then, at least one historical correspondence difference value corresponding to the determined target difference value is determined. Here, the historical correspondence difference value is a difference value between test data and estimated test data of the corresponding historical test time point of the test time point. The corresponding historical test time point may be a historical synchronous time point corresponding to the test time point. As an example, assuming that the test time point is 12 o'clock on May 16, 2018, and the corresponding historical test time point of the test time point may be 12 o'clock of each day of a past preset duration. Assuming that the preset duration is the last 30 days, and at 12 o'clock of each day of the last 30 days, the executing body or other electronic devices may test the target object, generate test data, and perform a fitting calculation based on data obtained by testing in the historical period (for example, 11:30 to 12:00) corresponding to the historical test time point to obtain estimated test data corresponding to the test data. In the end, 30 historical correspondence difference values may be obtained.

Finally, based on the determined target difference value and the determined at least one historical correspondence difference value, a data fluctuation value representing the fluctuation of the test data generated at the test time point is generated and outputted. The data fluctuation value may be used to represent the fluctuation of the test data generated at the test time point compared to the corresponding test data generated at each corresponding historical test time point. The larger the data fluctuation value, the larger the fluctuation degree the test data generated at the test time point compared to the test data generated at corresponding historical test time points. Specifically, the executing body may generate the data fluctuation value using various methods based on the determined target difference value and the determined at least one historical correspondence difference value. As an example, the mean value of the test data generated at corresponding historical test time points of the test time point may be calculated, and the difference between the test data generated at the test time point and the calculated mean value may be determined as the data fluctuation value corresponding to the test time point.

The executing body may output the generated data fluctuation value corresponding to the test time point in various ways. For example, the generated data fluctuation value is displayed on a display device connected to the executing body in the form of a table, a graphic, or the like.

After performing the above step 203, the executing body may output a plurality of data fluctuation values, where each data fluctuation value corresponds to a test time point. Generally, the output data fluctuation value is displayed on the display device in the form of a curve, and the curve is formed by connecting a plurality of points corresponding to the data fluctuation values in a preset coordinate system.

In some alternative implementations of the present embodiment, for the test time point in the target period, the executing body may generate and output a data fluctuation value representing the fluctuation of the test data generated at the test time point according to the following steps.

First, the distribution of the determined target difference value and the determined at least one historical correspondence difference is determined as a normal distribution.

Then, standard scores of the determined target difference value and a historical correspondence difference value in the determined at least one historical correspondence difference value under the normal distribution are determined as distribution deviation values. Generally, in pieces of data that are normally distributed, a standard score (also known as a z-score) may characterize the degree to which a piece of data deviates from the mean value of all the pieces of data. The standard score is obtained by the following formula:

$$z = \frac{x - \mu}{\sigma} \quad (1)$$

Here, z is the standard score, x is the target difference value or historical correspondence difference value, $\mu$ is the mean value of the target difference value and the historical correspondence difference value, and $\sigma$ is the standard deviation of the target difference value and the at least one historical correspondence difference value. By the calculation of the above formula (1), the distribution deviation values of the target difference value and the historical correspondence difference value in the at least one historical correspondence difference value may be obtained. As an example, the distribution deviation values may be written as $\varepsilon_t, \varepsilon_{t-T}, \varepsilon_{t-2T} \ldots, \varepsilon_{t-kT}$. Here, t is the current test time point, T is the preset period (e.g., 1 day), k is the preset integer (e.g., 30), the product of k and T is the preset duration (e.g., 30 days), $\varepsilon_t$ is the distribution deviation value of the target difference value, and $\varepsilon_{t-T}, \varepsilon_{t-2T} \ldots, \varepsilon_{t-kT}$ are the distribution deviation values of the historical correspondence difference values. In practice, since the variation ranges of the target difference value and the historical correspondence difference value are large, the variation range of the generated distribution deviation value is smaller than the variation ranges of the target difference value and the historical correspondence difference value, so that the difficulty of calculating the data fluctuation value may be reduced, thereby improving the calculation efficiency, and improving the accuracy of data fluctuation value generation.

Finally, the data fluctuation value representing the fluctuation of the test data generated at the test time point is generated and outputted, based on the distribution deviation value of the determined target difference value and the distribution deviation value of the historical correspondence difference value in the determined at least one historical correspondence difference value.

In some alternative implementations of the present embodiment, the executing body may generate and output a data fluctuation value representing the fluctuation of the test data generated at the test time point according to the following steps.

First, the distribution of the determined distribution deviation values is determined as a normal distribution. Generally, when the number of the historical correspondence difference value is large (for example, when the number of the historical correspondence difference values is greater than a preset number threshold), since the normal distribution can accurately characterize the distribution of distribution deviation values, the distribution of the determined distribution deviation values may be determined as the normal distribution.

Then, a standard score of the distribution deviation value corresponding to the determined target difference value under the normal distribution is determined as the data fluctuation value representing the fluctuation of the test data tested at the test time point, and outputted. The method for calculating the standard score in this step is the same as the method for calculating the standard score in the above formula (1), and detailed description thereof will be omitted.

In some alternative implementations of the present embodiment, the executing body may alternatively generate and output a data fluctuation value representing the fluctuation of the test data generated at the test time point according to the following steps.

First, the determined distribution deviation values are converted into conversion values in a preset numerical interval. Generally, since the determined distribution deviation value may be a negative value and the random variable under the exponential distribution is a positive value, it is necessary to first convert the distribution deviation value. The preset numerical interval may be a numerical interval greater than 0, or may be an interval greater than a positive number. As an example, the executing body may add each distribution deviation value to a preset value to obtain a conversion value in the preset numerical interval. Alternatively, the probability value of each distribution deviation value under the normal distribution is taken as the base 10 (or other numerical value) logarithm and then inverted to obtain a conversion value greater than 0.

Then, a distribution of the conversion values obtained by converting is determined as an exponential distribution. Generally, when the number of the historical correspondence difference values is small, using a normal distribution results in inaccurate calculation of the data fluctuation value. Therefore, when the number of the historical correspondence difference value is small (for example, when the number of the historical correspondence difference values is smaller than or equal to a preset number threshold), the distribution of the conversion values obtained by converting is determined as the exponential distribution.

Finally, a probability value of the conversion value corresponding to the target difference value under the exponential distribution is determined as the data fluctuation value representing the fluctuation of the test data generated at the test time point and the probability value is outputted. From the probability distribution function of the exponential distribution, the probability value of the conversion value under the exponential distribution may be obtained. The probability distribution function of the exponential distribution is as follows:

$$F(\varepsilon'_i) = 1 - e^{-\frac{\varepsilon'_i}{\sum_{i=1}^{m}\varepsilon'_i}} \quad (2)$$

Here, i is the serial number of the conversion value, m is the number of conversion values, $\varepsilon'_i$ is the conversion value. $F(\varepsilon'_i)$ is the probability value of the conversion value under the exponential distribution. Through the calculation of the above formula (2), the executing body may calculate the probability value of the conversion value corresponding to the target difference value under the exponential distribution as the data fluctuation value corresponding to the test time point.

Alternatively, it may be seen from the above formula (2) that since $F(\varepsilon'_i)$ and $$\frac{\varepsilon'_i}{\sum_{i=1}^{m}\varepsilon'_i}$$

are positively correlated, the data fluctuation value corresponding to the conversion value $\varepsilon'_i$ may be determined as $$\frac{\varepsilon'_i}{\sum_{i=1}^{m}\varepsilon'_i}.$$

Figure 3:
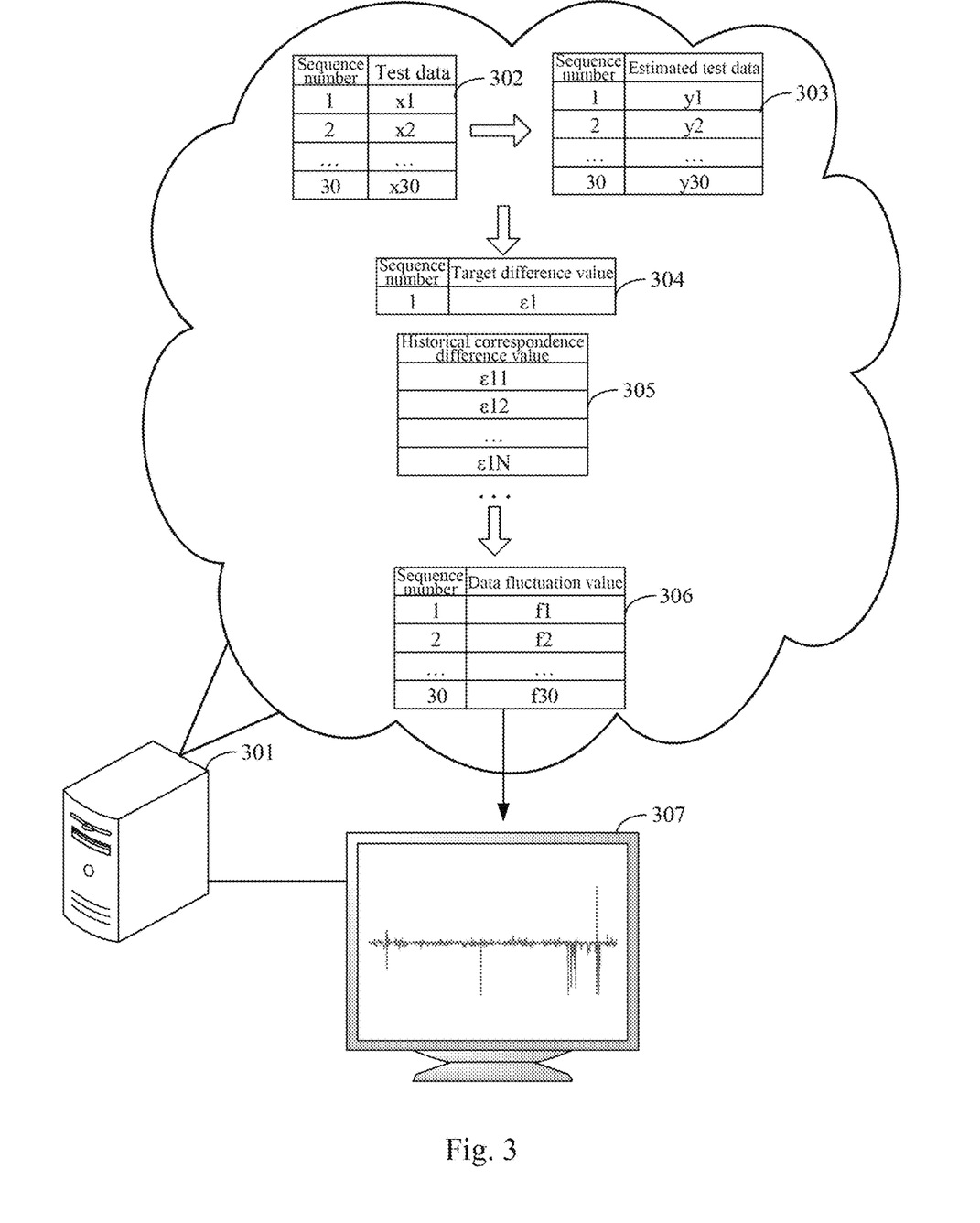
FIG. 3 is a schematic diagram of an application scenario of the method for outputting information according to an embodiment of the present disclosure.

With further reference to FIG. 3, FIG. 3 is a schematic diagram of an application scenario of the method for outputting information according to the present embodiment. In the application scenario of FIG. 3, the server 301 first acquires the amount for accessing a certain website as at least one piece of test data 302 (i.e., x1 to x30 in the figure, the statistics of the accessing amount being performed per minute in a target period (for example, 12:00 to 12:30 on May 16, 2018)). Then, the server 301 performs a fitting calculation on the at least one piece of test data 302 to obtain estimated test data 303 (i.e., y1 to y30 in the figure) in the target period. Next, the server 301 determines the difference value between the test data piece x1 generated at the test time point (i.e., 12:01) corresponding to the sequence number 1 and the estimated test data piece y1 corresponding to the test time point calculated by fitting as the target difference value ε1 (i.e., 304 in the figure). Further, at least one historical correspondence difference value ε11~ε1N (i.e., 305 in the figure) corresponding to the target difference value ε1 is determined, where the preset value N is the number of days passed, and ε11~ε1N is the difference value between the test data generated at 12:01 of each day of the past N days and the estimated test data. Then, the server 301 generates a data fluctuation value f1 representing the fluctuation of the test data generated at the test time point based on the target difference value ε1 and the at least one historical correspondence difference value ε11 to ε1N. Finally, the server 301 calculates and obtains the data fluctuation values f1 to f30 (i.e., 306 in the figure) corresponding to each test time point in the target period. The server further displays the generated data fluctuation values graphically on the display 307.

The method for outputting information provided by the embodiments of the present disclosure acquires at least one piece of test data generated in a target period, then performs a fitting calculation on the at least one piece of test data to obtain estimated test data in the target period, and then determines, for a test time point in the target period, a corresponding target difference value and a historical correspondence difference value, and generates and outputs a data fluctuation value representing a fluctuation of the test data generated at the test time point based on the determined target difference value and the determined historical correspondence difference value, thereby improving the accuracy of characterizing the fluctuation of the test data and improving the flexibility of processing the test data.

Figure 4:
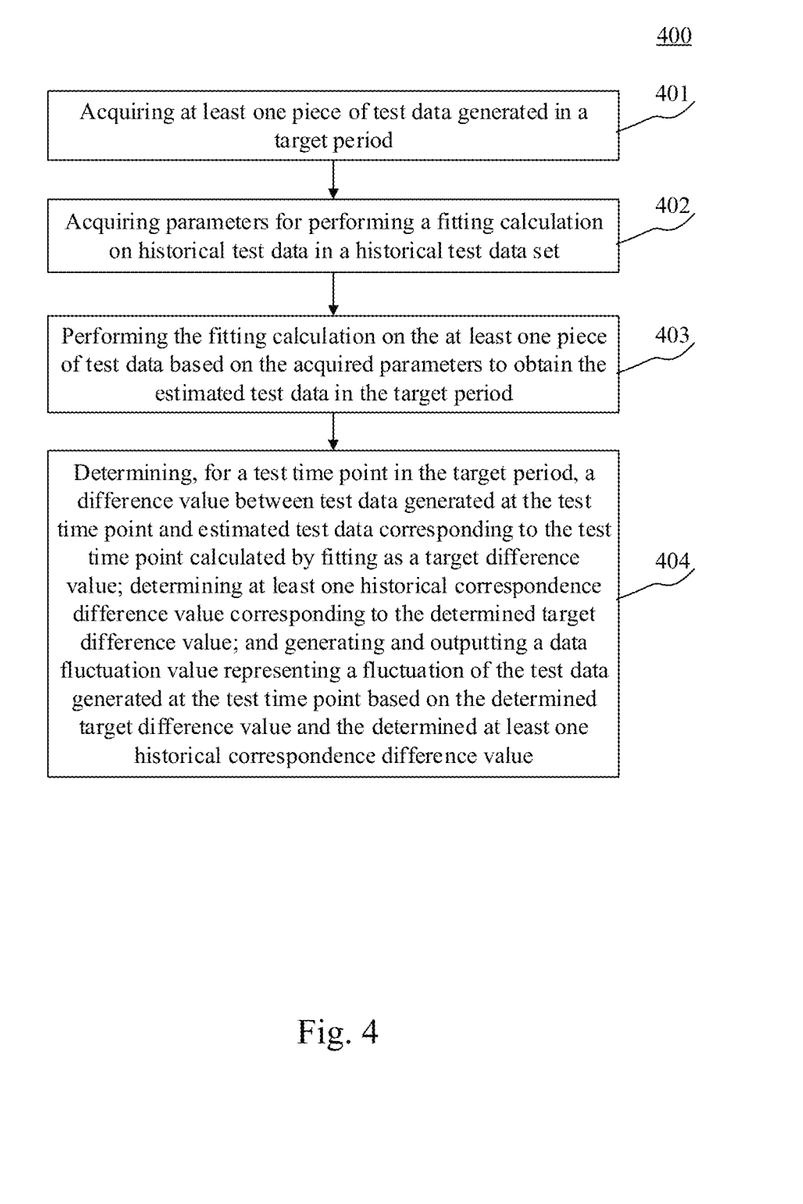
FIG. 4 is a flowchart of another embodiment of the method for outputting information according to the present disclosure.

With further reference to FIG. 4, a flow 400 of another embodiment of the method for outputting information is shown. The flow 400 of the method for outputting information includes the following steps 401 to 404.

Step 401 includes acquiring at least one piece of test data generated in a target period.

In the present embodiment, step 401 is substantially the same as step 201 in the corresponding embodiment of FIG. 2, and detailed description thereof will be omitted.

Step 402 includes acquiring parameters for performing a fitting calculation on historical test data in a historical test data set.

In the present embodiment, the executing body of the method for outputting information (for example, the server as shown in FIG. 1) may acquire parameters for performing the fitting calculation on historical test data in the historical test data set remotely or locally. Here, the historical test data may be test data generated in a period before the target period, and the target object corresponding to the historical test data may be the same as the target object corresponding to the at least one piece test data acquired in step 401. For example, the historical test data and the at least one piece of test data may be test data obtained by testing the amount of accessing a certain website.

Generally, the historical test data set may include at least one historical test data subset, and for each historical test data subset in the at least one historical test data subset, the historical test data subset corresponds to a historical period, and the historical test data included in the historical test data subset is test data generated by testing the target object in the corresponding historical period. Generally, when performing the fitting calculation on the historical test data, the fitting calculation may be respectively performed on the historical test data included in the historical test data subset corresponding to each historical period, and correspondingly, the parameters used to perform the fitting calculation on the historical test data included in each of the historical test data subsets may be different. The historical periods corresponding to the at least one historical test data subset may be historical periods successively adjacent to each other before the target period, and the successive adjacent historical periods include a historical period that is closest to the target period.

Step 403 includes performing the fitting calculation on the at least one piece of test data based on the acquired parameters to obtain the estimated test data in the target period.

In the present embodiment, the executing body may perform the fitting calculation on the at least one piece of test data based on the acquired parameters to obtain the estimated test data in the target period. In practice, the executing body may perform the fitting calculation on at least one piece of test data corresponding to each historical period and the target period using an ILS (Iteratively Re-weighted Least Squares) algorithm. The algorithm is represented by the following loss function:

$$L = \sum_{i=1}^{m} w_i(y_i - f(x_i))^2 \quad (3)$$

Here, L is the function value of the loss function, and the smaller the function value, the closer the fitting result to the actual situation. i is the sequence number of the piece of test data in the at least one piece of test data, and m is the number of the piece of test data included in the at least one piece of test data. $y_i$ is the test data, $x_i$ is the value representing the test time point corresponding to the test data, $f(x_i)$ is the estimated test data corresponding to the test data, and $w_i$ the weighted value for adjusting the difference value between the test data and the estimated test data. $f(x_i)$ may usually be determined as follows:

$$f(x_i) = kx_i + b \quad (4)$$

Here, k and b are the parameters to be determined.

When using the IRLS algorithm for the fitting calculation, it is usually necessary to set the initial values $w_{10}$ to $w_{m0}$ of the weights $w_1$ to $w_m$, the values of the parameters k and b are adjusted through multiple iteration calculations, and each weight value is updated according to the formula $w_i=1/|y_i-kx_i-b|$, and finally the weight values, the value of k, and the value of b used in the fitting calculation are obtained.

As an example, the above initial values $w_{10}$ to $w_{m0}$ may be set to a preset value (for example, "1"), or the above initial values $w_{10}$ to $w_{m0}$ may be set to a weight value used for fitting calculation corresponding to the historical period closest to the target period, and then the iteration calculations are performed. It should be noted that the IRLS algorithm is a well-known technology widely studied and applied at present, and a method for determining parameters used in the algorithm is not further described herein.

As another example, since the set initial values $w_{10}$ to $w_{m0}$ of the weight values have an influence on the fitting result of the fitting calculation, it is necessary to determine reasonable initial values $w_{10}$ to $W_{m0}$. The executing body may acquire parameters used for continuing fitting calculation for each historical test data subset in the at least one historical test data subset, and determine, based on the acquired parameters, a function value of the loss function corresponding to each historical test data subset, select a parameter corresponding to the smallest function value as the target parameter, and determine the k value included in the target parameter as $k_0$. Substituting $k_0$ into the following formula:

$$L'_i = y_i - k_0 x_i \quad (5)$$

Here, i=1, 2, 3, . . . , m, i is the sequence number of the at least one piece of test data corresponding to the target period, m is the number of the piece of test data included in the at least one piece of test data, $y_i$ is the test data, and $x_i$ is the value representing the test time point corresponding to the test data. After the calculation of the above formula (5), m calculation results $L'_1$ to $L'_m$ may be obtained, and from the m calculation results, the median value is determined as the value of the parameter $b_0$. Here, in order to make the calculated value of $b_0$ satisfy the minimum value of $(y_i-f(x_i))^2$, it is usually necessary to derive the parameter b to calculate $b_0$. If the median value of $L'_1$ to $L'_m$ is determined as $b_0$, then the value of $(y_i-f(x_i))^2$ is minimized, which simplifies the calculation steps and reduces the time complexity of calculating the initial values of the weight values. By substituting $k_0$ and $b_0$ into the formula $w_{i0}=1/|y_i-k_0x_i-b_0|$, the initial values $w_{10}$ to $w_{m0}$ of the weight values may be acquired. By using the initial values $w_{10}$ to $w_{m0}$ of the weight values obtained in this example, the initial values of the weight values may be correlated with the parameters used for fitting calculation of the historical test data, and the calculation error caused by manually selecting the initial values of the weight values may be reduced. In addition, the mutation of the estimated test data may be reduced, which helps to improve the accuracy of the finally obtained data fluctuation value.

Step 404 includes determining, for a test time point in the target period, a difference value between test data generated at the test time point and estimated test data corresponding to the test time point calculated by fitting as a target difference value; determining at least one historical correspondence difference value corresponding to the determined target difference value; and generating and outputting a data fluctuation value representing a fluctuation of the test data generated at the test time point based on the determined target difference value and the determined at least one historical correspondence difference value.

In the present embodiment, step 404 is substantially the same as step 203 in the corresponding embodiment of FIG. 2, and detailed description thereof will be omitted.

In some alternative implementations of the present embodiment, after the generating and outputting a data fluctuation value representing a fluctuation of the test data generated at the test time point, the executing body may output preset warning information, in response to determining that an absolute value of the generated data fluctuation value is greater than a preset fluctuation threshold. Here, the warning information may include, but is not limited to, at least one of the following: sound information, image information, text information, or the like. By outputting the warning information, it may help the technician to know an abnormality of the test data as soon as possible.

As may be seen from FIG. 4, the flow 400 of the method for outputting information in the present embodiment highlights the step of performing a fitting calculation on the at least one piece of test data, as compared to the embodiment corresponding to FIG. 2. Thus, the solution described in the present embodiment may reduce the mutation of the estimated test data, which helps to improve the accuracy of the finally obtained data fluctuation value.

Figure 5:
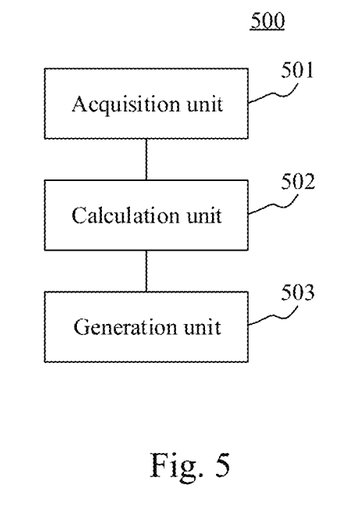
FIG. 5 is a schematic structural diagram of an embodiment of an apparatus for outputting information according to the present disclosure.

With further reference to FIG. 5, as an implementation of the method shown in the above figures, the present disclosure provides an embodiment of an apparatus for outputting information, and the embodiment of the apparatus corresponds to the embodiment of the method as shown in FIG. 2, and the apparatus may be specifically applied to various electronic devices.

As shown in FIG. 5, the apparatus 500 for outputting information of the present embodiment includes: an acquisition unit 501, configured to acquire at least one piece of test data generated in a target period; a calculation unit 502, configured to perform a fitting calculation on the at least one piece of test data to obtain estimated test data in the target period; and a generation unit 503, configured to determine, for a test time point in the target period, a difference value between test data generated at the test time point and estimated test data corresponding to the test time point calculated by fitting as a target difference value; determine at least one historical correspondence difference value corresponding to the determined target difference value, the historical correspondence difference value being a difference value between test data and estimated test data of a corresponding historical test time point of the test time point; and generate and output a data fluctuation value representing a fluctuation of the test data generated at the test time point based on the determined target difference value and the determined at least one historical correspondence difference value.

In the present embodiment, the acquisition unit 501 may acquire at least one piece of test data generated in a target period remotely or locally through a wired connection or a wireless connection. The piece of test data may be test data (for example, the access traffic of a certain website, the download amount of a certain software, etc.) obtained by testing a target object (for example, a certain website, a certain software, etc.) at a certain time point. The target period may be one of a plurality of periods preset by a technician, and in each period, the apparatus 500 or other electronic devices may inspect the target object according to a preset inspection period (for example, one minute) to obtain at least one piece of test data. The executing body may select one period from the plurality of periods as the target period (for example, the period closest to the current time).

In the present embodiment, based on the at least one test data acquired by the acquisition unit 501, the calculation unit 502 may perform a fitting calculation on the at least one piece of test data to obtain estimated test data in the target period. Here, for each of the at least one piece of test data, the piece of test data corresponds to one estimated test data. Specifically, the calculation unit 502 may perform a fitting calculation on the at least one test data based on an existing fitting calculation method (such as the least squares method and the iterative weighted least squares method).

In the present embodiment, for a test time point in the target period, the generation unit 503 may first determine a difference value between test data generated at the test time point and estimated test data corresponding to the test time point calculated by fitting as a target difference value. Generally, the target period may include a preset number of test time points. At each test time point, the apparatus 500 or other electronic devices may test the target object to generate the test data.

Then, at least one historical correspondence difference value corresponding to the determined target difference value is determined. Here, the historical correspondence difference value is a difference value between test data and estimated test data of the corresponding historical test time point of the test time point. The corresponding historical test time point may be a historical synchronous time point corresponding to the test time point. As an example, assuming that the test time point is 12 o'clock on May 16, 2018, and the corresponding historical test time point of the test time point may be 12 o'clock of each day of the past preset duration. Assuming that the preset duration is the last 30 days, and at 12 o'clock of each day of the last 30 days, the apparatus 500 or other electronic devices may test the target object, generate test data, and perform a fitting calculation based on the test data obtained by testing in the historical period (for example, 11:30 to 12:00) corresponding to the historical test time point to obtain the estimated test data corresponding to the test data. In the end, 30 historical correspondence difference values may be obtained.

Finally, based on the determined target difference value and the determined at least one historical correspondence difference value, a data fluctuation value representing the fluctuation of the test data generated at the test time point is generated and outputted. The data fluctuation value may be used to represent the fluctuation of the test data generated at the test time point compared to the corresponding test data generated at each corresponding historical test time point. The larger the data fluctuation value, the larger the fluctuation degree the test data generated at the test time point compared to the test data generated at each corresponding historical test time point. Specifically, the generation unit 503 may generate the data fluctuation value using various methods based on the determined target difference value and the determined at least one historical correspondence difference value. As an example, the mean value of the test data generated at corresponding historical test time points of the test time point may be calculated, and the difference between the test data generated at the test time point and the calculated mean value may be determined as the data fluctuation value corresponding to the test time point.

In some alternative implementations of the present embodiment, the calculation unit may include: an acquisition module (not shown in the figure), configured to acquire parameters for performing a fitting calculation on historical test data in a historical test data set; and a calculation module (not shown in the figure), configured to perform the fitting calculation on the at least one piece of test data based on the acquired parameters to obtain the estimated test data in the target period.

In some alternative implementations of the present embodiment, the generation unit may include: a first determination module (not shown in the figure), configured to determine a distribution of the determined target difference value and the determined at least one historical correspondence difference as a normal distribution; a second determination module (not shown in the figure), configured to determine, standard scores of the determined target difference value and a historical correspondence difference value in the determined at least one historical correspondence difference value under the normal distribution as distribution deviation values; and a generation module (not shown in the figure), configured to generate and output the data fluctuation value representing the fluctuation of the test data generated at the test time point, based on the distribution deviation value of the determined target difference value and the distribution deviation value of the historical correspondence difference value in the determined at least one historical correspondence difference value.

In some alternative implementations of the present embodiment, the generation module may include: a first determination submodule (not shown in the figure), configured to determine a distribution of the determined distribution deviation values as a normal distribution; and a first outputting submodule (not shown in the figure), configured to determine a standard score of the distribution deviation value corresponding to the determined target difference value under the normal distribution as the data fluctuation value representing the fluctuation of the test data tested at the test time point and output the standard score.

In some alternative implementations of the present embodiment, the generation module may include: a conversion submodule (not shown in the figure), configured to convert the determined distribution deviation values into conversion values in a preset numerical interval; a second determination submodule (not shown in the figure), configured to determine a distribution of the conversion values obtained by converting as an exponential distributions; and a second outputting submodule (not shown in the figure), configured to determine a probability value of the conversion value corresponding to the target difference value under the exponential distribution as the data fluctuation value representing the fluctuation of the test data generated at the test time point and output the probability value.

In some alternative implementations of the present embodiment, the apparatus 500 may further include: an outputting unit (not shown in the figure), configured to output preset warning information, in response to determining that an absolute value of the generated data fluctuation value is greater than a preset fluctuation threshold.

The apparatus for outputting information provided by the embodiments of the present disclosure acquires at least one piece of test data generated in a target period, then performs a fitting calculation on the at least one test data to obtain estimated test data in the target period, and then determines, for a test time point in the target period, a corresponding target difference value and a historical correspondence difference value, and generates and outputs a data fluctuation value representing a fluctuation of the test data generated at the test time point based on the determined target difference value and the determined historical correspondence difference value, thereby improving the accuracy of characterizing the fluctuation of the test data and improving the flexibility of processing the test data.

Figure 6:
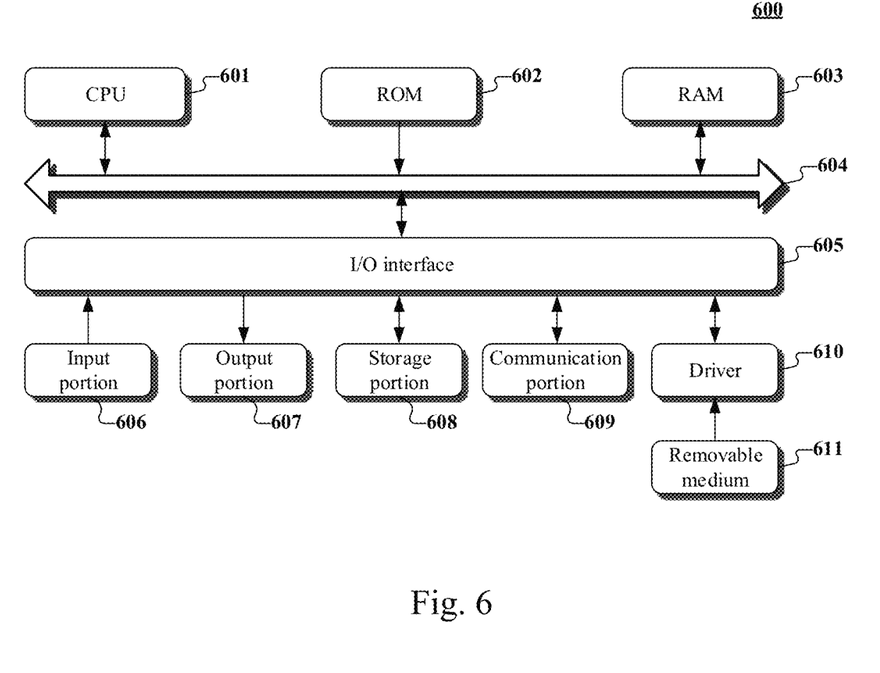
FIG. 6 is a schematic structural diagram of a computer system adapted to implement a server of the embodiments of the present disclosure.

With further reference to FIG. 6, a schematic structural diagram of a computer system 600 adapted to implement a server of the embodiments of the present disclosure is shown. The server shown in FIG. 6 is merely an example, and should not limit the function and scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse, etc.; an output portion 607 including such as a cathode ray tube (CRT), a liquid crystal display device (LCD), a speaker, etc.; a storage portion 608 including a hard disk and the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 609, and/or may be installed from the removable medium 611. The computer program, when executed by the central processing unit (CPU) 601, implements the above mentioned functionalities as defined by the method of some embodiments of the present disclosure. It should be noted that the computer readable medium in some embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In some embodiments of the present disclosure, the computer storage medium may be any physical medium containing or storing programs which may be used by a command execution system, apparatus or element or incorporated thereto. In some embodiments of the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for performing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor, for example, described as: a processor, including an acquisition unit, a calculation unit and a generation unit. Here, the names of these units do not in some cases constitute a limitation to such units themselves. For example, the acquisition unit may also be described as "a unit for acquiring at least one piece of test data generated in a target period."

In another aspect, the present disclosure further provides a computer readable medium. The computer readable medium may be included in the server in the above described embodiments, or a stand-alone computer readable medium not assembled into the server. The computer readable medium stores one or more programs. The one or more programs, when executed by the server, cause the server to: acquire at least one piece of test data generated in a target period; perform a fitting calculation on the at least one piece of test data to obtain estimated test data in the target period; and determine, for a test time point in the target period, a difference value between test data generated at the test time point and estimated test data corresponding to the test time point calculated by fitting as a target difference value; determine at least one historical correspondence difference value corresponding to the determined target difference value, the historical correspondence difference value being a difference value between test data and estimated test data of a corresponding historical test time point of the test time point; and generate and output a data fluctuation value representing a fluctuation of the test data generated at the test time point based on the determined target difference value and the determined at least one historical correspondence difference value.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for outputting information, the method comprising:

acquiring at least one piece of test data generated in a target period;

performing, based on parameters for performing a historical fitting calculation on historical test data, a target fitting calculation on the at least one piece of test data to obtain estimated test data in the target period, wherein the parameters are acquired based on a historical weight value for adjusting a difference between the historical test data and historical estimated test data in a loss function, and an initial value of a target weight value for the target fitting calculation in the loss function is obtained based on the parameters for performing the historical fitting calculation on the historical test data; and determining, for a test time point in the target period, a difference value between the test data generated at the test time point and the estimated test data corresponding to the test time point calculated by fitting as a target difference value;

determining, based on a data structure stored in a server computer, at least one historical correspondence difference value corresponding to the determined target difference value, the historical correspondence difference value being a difference value between test data and estimated test data of a corresponding historical test time point of the test time point; and generating and outputting a data fluctuation value representing a fluctuation of the test data generated at the test time point based on the determined target difference value and the determined at least one historical correspondence difference value, wherein the data structure defines a corresponding relationship between historical test time points, and difference values between the test data generated at the historical test time points and the estimated test data obtained by performing the historical fitting calculation on the test data generated at the historical test time points, wherein the method is performed by at least one hardware processor.

2. The method according to claim 1, wherein the generating and outputting a data fluctuation value representing a fluctuation of the test data generated at the test time point based on the determined target difference value and the determined at least one historical correspondence difference value comprises:

determining a distribution of the determined target difference value and the determined at least one historical correspondence difference as a normal distribution;

determining, standard scores of the determined target difference value and a historical correspondence difference value in the determined at least one historical correspondence difference value under the normal distribution as distribution deviation values; and generating and outputting the data fluctuation value representing the fluctuation of the test data generated at the test time point, based on the distribution deviation value of the determined target difference value and the distribution deviation value of the historical correspondence difference value in the determined at least one historical correspondence difference value.

3. The method according to claim 2, wherein the generating and outputting the data fluctuation value representing the fluctuation of the test data generated at the test time point, based on the distribution deviation value of the determined target difference value and the distribution deviation value of the historical correspondence difference value in the determined at least one historical correspondence difference value comprises:
  determining a distribution of the determined distribution deviation values as the normal distribution; and
  determining a standard score of the distribution deviation value corresponding to the determined target difference value under the normal distribution as the data fluctuation value representing the fluctuation of the test data tested at the test time point and outputting the standard score.

4. The method according to claim 2, wherein the generating and outputting the data fluctuation value representing the fluctuation of the test data generated at the test time point, based on the distribution deviation value of the determined target difference value and the distribution deviation value of the historical correspondence difference value in the determined at least one historical correspondence difference value comprises:
  converting the determined distribution deviation values into conversion values in a preset numerical interval;
  determining a distribution of the conversion values obtained by converting as an exponential distribution; and
  determining a probability value of the conversion value corresponding to the target difference value under the exponential distribution as the data fluctuation value representing the fluctuation of the test data generated at the test time point and outputting the probability value.

5. The method according to claim 1, wherein after the generating and outputting a data fluctuation value representing a fluctuation of the test data generated at the test time point, the method further comprises:
  outputting preset warning information, in response to determining that an absolute value of the generated data fluctuation value is greater than a preset fluctuation threshold.

6. The method according to claim 1, wherein the test data is accessed traffic of a certain website.

7. The method according to claim 1, wherein the test data is a download amount of a certain software.

8. An apparatus for outputting information, the apparatus comprising:
  at least one processor; and
  a memory storing instructions, wherein the instructions when executed by the at least one processor, cause the at least one processor to perform operations, the operations comprising:
  acquiring at least one piece of test data generated in a target period;
  performing, based on parameters for performing a historical fitting calculation on historical test data, a target fitting calculation on the at least one piece of test data to obtain estimated test data in the target period, wherein the parameters are acquired based on a historical weight value for adjusting a difference between the historical test data and historical estimated test data in a loss function, and an initial value of a target weight value for the target fitting calculation in the loss function is obtained based on the parameters for performing the historical fitting calculation on the historical test data; and
  determining, for a test time point in the target period, a difference value between the test data generated at the test time point and the estimated test data corresponding to the test time point calculated by fitting as a target difference value;
  determine, based on a data structure stored in a server computer, at least one historical correspondence difference value corresponding to the determined target difference value, the historical correspondence difference value being a difference value between test data and estimated test data of a corresponding historical test time point of the test time point; and
  generate and output a data fluctuation value representing a fluctuation of the test data generated at the test time point based on the determined target difference value and the determined at least one historical correspondence difference value, wherein the data structure defines a corresponding relationship between historical test time points, and difference values between the test data generated at the historical test time points and the estimated test data obtained by performing the historical fitting calculation on the test data generated at the historical test time points.

9. The apparatus according to claim 8, wherein the performing a fitting calculation on the at least one test data to obtain estimated test data in the target period comprises:
  acquiring parameters for performing a fitting calculation on historical test data in a historical test data set; and
  performing the fitting calculation on the at least one piece of test data based on the acquired parameters to obtain the estimated test data in the target period.

10. The apparatus according to claim 8, wherein the generating and outputting a data fluctuation value representing a fluctuation of the test data generated at the test time point based on the determined target difference value and the determined at least one historical correspondence difference value comprises:
  determining a distribution of the determined target difference value and the determined at least one historical correspondence difference as a normal distribution;
  determining, standard scores of the determined target difference value and a historical correspondence difference value in the determined at least one historical correspondence difference value under the normal distribution as distribution deviation values; and
  generating and outputting the data fluctuation value representing the fluctuation of the test data generated at the test time point, based on the distribution deviation value of the determined target difference value and the distribution deviation value of the historical correspondence difference value in the determined at least one historical correspondence difference value.

11. The apparatus according to claim 10, wherein the generating and outputting the data fluctuation value representing the fluctuation of the test data generated at the test time point, based on the distribution deviation value of the determined target difference value and the distribution deviation value of the historical correspondence difference value in the determined at least one historical correspondence difference value comprises:
  determining a distribution of the determined distribution deviation values as the normal distribution; and determining a standard score of the distribution deviation value corresponding to the determined target difference value under the normal distribution as the data fluctuation value representing the fluctuation of the test data tested at the test time point and output the standard score.

12. The apparatus according to claim 10, wherein the generating and outputting the data fluctuation value representing the fluctuation of the test data generated at the test time point, based on the distribution deviation value of the determined target difference value and the distribution deviation value of the historical correspondence difference value in the determined at least one historical correspondence difference value comprises:

converting the determined distribution deviation values into conversion values in a preset numerical interval;

determining a distribution of the conversion values obtained by converting as an exponential distribution; and determining a probability value of the conversion value corresponding to the target difference value under the exponential distribution as the data fluctuation value representing the fluctuation of the test data generated at the test time point and output the probability value.

13. The apparatus according to claim 8, wherein after the generating and outputting a data fluctuation value representing a fluctuation of the test data generated at the test time point, the operations further comprise:

outputting preset warning information, in response to determining that an absolute value of the generated data fluctuation value is greater than a preset fluctuation threshold.

14. A non-transitory computer readable medium, storing a computer program thereon, the computer program, when executed by a processor, causes the processor to perform operations, the operations comprising:

acquiring at least one piece of test data generated in a target period;

performing, based on parameters for performing a historical fitting calculation on historical test data, a target fitting calculation on the at least one piece of test data to obtain estimated test data in the target period, wherein the parameters are acquired based on a historical weight value for adjusting a difference between the historical test data and historical estimated test data in a loss function, and an initial value of a target weight value for the target fitting calculation in the loss function is obtained based on the parameters for performing the historical fitting calculation on the historical test data; and determining, for a test time point in the target period, a difference value between the test data generated at the test time point and the estimated test data corresponding to the test time point calculated by fitting as a target difference value;

determining, based on a data structure stored in a server computer, at least one historical correspondence difference value corresponding to the determined target difference value, the historical correspondence difference value being a difference value between test data and estimated test data of a corresponding historical test time point of the test time point; and generating and outputting a data fluctuation value representing a fluctuation of the test data generated at the test time point based on the determined target difference value and the determined at least one historical correspondence difference value, wherein the data structure defines a corresponding relationship between historical test time points, and difference values between the test data generated at the historical test time points and the estimated test data obtained by performing the historical fitting calculation on the test data generated at the historical test time points.

* * * * *